US012703573B2

(12) United States Patent
Raaz

(10) Patent No.: US 12,703,573 B2
(45) Date of Patent: Aug. 11, 2026

(54) METHOD FOR DETERMINING A DISTANCE-RELATED RUNNING FRICTIONAL RESISTANCE OF THE BELT CONVEYOR SYSTEM

(71) Applicant: FLSmidth A/S, Valby (DK)

(72) Inventor: Viktor Raaz, Bochum (DE)

(73) Assignee: Virta, Inc., Carlsbad, CA (US)

( * ) Notice: Subject to any disclaimer, the term of this patent is extended or adjusted under 35 U.S.C. 154(b) by 482 days.

(21) Appl. No.: 18/037,318

(22) PCT Filed: Nov. 5, 2021

(86) PCT No.: PCT/EP2021/080805
§ 371 (c)(1),
(2) Date: May 16, 2023

(87) PCT Pub. No.: WO2022/101104
PCT Pub. Date: May 19, 2022

(65) Prior Publication Data

US 2024/0101358 A1 Mar. 28, 2024

(30) Foreign Application Priority Data

Nov. 16, 2020 (BE) .................................. 2020/5820

(51) Int. Cl.
*B65G 43/02* (2006.01)

(52) U.S. Cl.
CPC ...... *B65G 43/02* (2013.01); *B65G 2203/0258* (2013.01); *B65G 2203/0291* (2013.01)

(58) Field of Classification Search
None
See application file for complete search history.

(56) References Cited

U.S. PATENT DOCUMENTS 7,810,634 B2 * 10/2010 Wallace ................. B65G 15/36 198/810.02
9,139,376 B2 * 9/2015 Andreoli .................. G01L 5/04
(Continued)

FOREIGN PATENT DOCUMENTS

DE 102007002015 A1 7/2008
WO 20199166414 A1 9/2019

OTHER PUBLICATIONS

The International Search Report and Written Opinion dated Feb. 4, 2022, 15 pages.

*Primary Examiner* — Kavel Singh

(57) ABSTRACT

The present invention relates to a method for determining a section-related running friction resistance of the belt conveyor system that is in operation. The method comprises at least the following steps:

Figure 1:
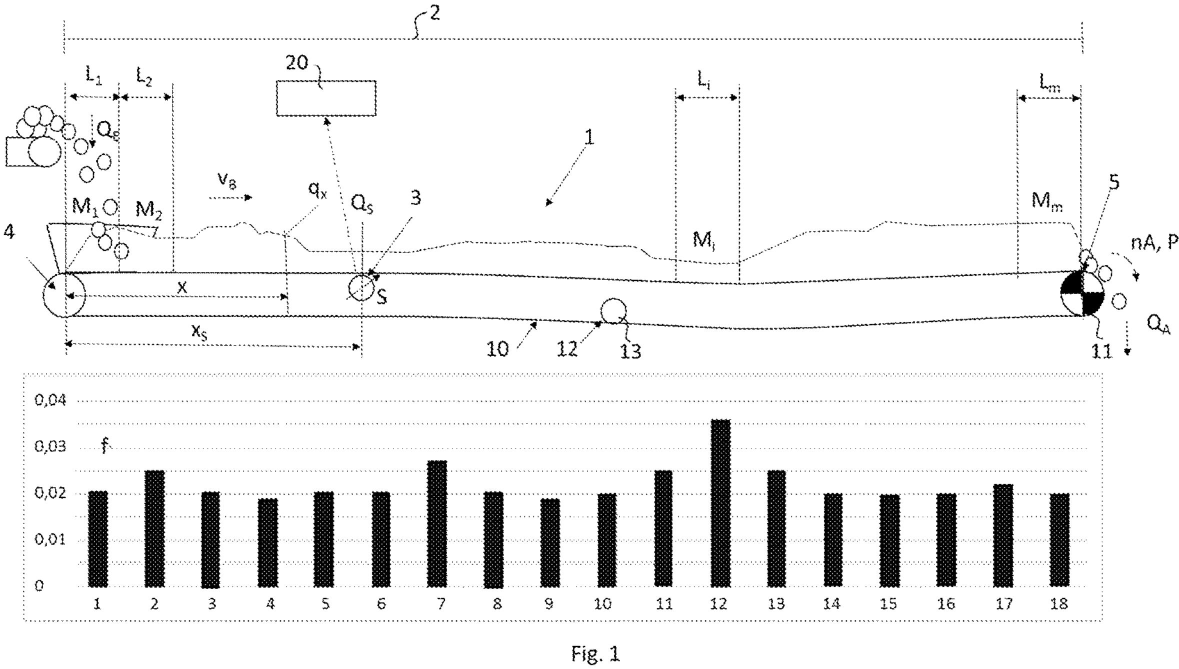

A) dividing the conveyor section of the belt conveyor system into "m" system-specific segments,
B) input of constant data at least with regard to the transport length of the belt conveyor system, the length of the segments and the incline or decline per segment into the evaluation device,
C) continuous recording of varying data at least with regard to the current conveyor belt speed and the drive power or the drive torque,
D) specification of determination data comprising at least a current material section mass and a segment-specific belt loading $q_m$ of the entire belt conveyor system based on the is measured material mass flow at the measurement point,
E) storage of the completely recorded varying data and the determination data in the evaluation device after each passage through a defined conveyor belt portion of the conveyor belt, wherein each passage is numbered with a consecutive index "j", and (Continued)

F) calculation of the load-dependent running friction resistance for each segment and the idling power of the belt conveyor system by the evaluation device by means of a system of equations using the constant data, the varying data and the determination data.

12 Claims, 3 Drawing Sheets

(56) References Cited

U.S. PATENT DOCUMENTS

| | | | | |
|---|---|---|---|---|
| 9,434,545 | B2 * | 9/2016 | DePaso | B65G 15/62 |
| 10,384,881 | B2 * | 8/2019 | Ziegler | G01G 11/003 |
| 11,220,403 | B2 * | 1/2022 | Ziegler | B65G 23/44 |

* cited by examiner

METHOD FOR DETERMINING A DISTANCE-RELATED RUNNING FRICTIONAL RESISTANCE OF THE BELT CONVEYOR SYSTEM

The present invention relates to a method for determining a section-related running friction resistance of the belt conveyor system that is in operation.

Belt conveyor systems that are used above or below ground have been known for decades, particularly in mining and in industry. They are primarily used to transport bulk goods such as overburden, ores, fuel and building materials, even over longer distances. Belt conveyor systems can therefore be several kilometers long and transport several thousand tons of bulk material per hour. Commonly known belt conveyor systems consist of a conveyor belt that is threaded as an endless loop in the band structure with a plurality of carrier roller stations and one or more drive and deflection drums. This conveyor belt is set in motion by one or more drive drums with one or more conveyor belt drives at a defined conveyor belt speed and is is advantageously continuously operated at this conveyor belt speed.

Fundamentally, belt conveyor systems are known which have frequency-related drives. Such frequency-related drives facilitate the starting and stopping processes significantly. Nevertheless, these belt conveyor systems are operated with a defined, constant conveyor belt speed in order to ensure the necessary throughput capacity, even in phases with a reduced conveying quantity or a variable conveying performance.

It is also fundamentally known that the belt conveyor system consists of a plurality of segments, such as trough regions, hollowed out regions, vertical curves, horizontal curves, straight sections, inclines, declines, etc. In addition, these segments often have different carrier roller distances and, accordingly, different running roll resistances for the conveyor belt. The running roll resistances are also dependent, in a known manner, on the loading condition and the conveyor belt speed, which in turn is also dependent on the belt conveyor system specification and the outside temperature.

A relative section-related evaluation of the running roll resistance is particularly desirable from a service point of view and also from a design point of view, but can only be implemented at great expense, for example by installing a plurality of force sensors in the conveyor belt. For example, DE10 2015 212 267 A1 describes a method and a device for specifying a section-specific energy consumption of belt conveyors. In addition to the known sensor systems for determining a drive line and the loading of the belt conveyor system, the belt conveyor described here also has an additional, third sensor system. This third sensor system is used to detect the tensile forces in the connecting portions between conveyor belt components. The conveyor belt is also designed as a steel cable conveyor belt, so that the third sensor system comprises a coil or at least one magnetic field sensor for detecting an accumulation of steel in the connecting portions. Consequently, the device described and the method described require not only an additional sensor system, but also a specific design of the conveyor belt and it is consequently more expensive to manufacture and to operate the belt conveyor system. Without additional sensor systems for the belt tension, DE10 2007 002 015 A1 describes a method for determining the specific power requirement of an operating belt conveyor system for bulk goods with a non-constant load. For this purpose, a load-dependent movement resistance for each of the n-portions of the same length of the belt conveyor is determined with the help of an estimated specific movement resistance and a current section load, as well as a lifting power (gradient resistance) required for each portion. The shunt, special and acceleration capacities are estimated and thus a total power requirement of the belt conveyor system is calculated. By comparing the calculated total power requirement with a measured electrical power requirement, a specific movement resistance for the entire conveyor system is determined. The theoretical power requirement for each individual portion of the belt conveyor system is therefore determined with the help of estimated values for section-specific movement, shunt and special resistances, wherein the subsequent comparison of the theoretical values with the measured values of the total drive power does not carry out a separate evaluation of the actual local running friction resistance coefficients via the different portions of the belt conveyor system.

Specifying the energy efficiency of a belt conveyor is known from WO 2019/166 414 A1.

It is therefore the object of the present invention to at least partially eliminate the disadvantages described above in a belt conveyor system and a method for determining a section-related running friction resistance of the belt conveyor system in operation. In particular, the object of the present invention is to create a belt conveyor system and a method that enables a section-related running friction resistance of the belt conveyor system in operation to be determined in a simple and cost-effective manner, i.e. without the use of additional measuring equipment, sensors, etc.

The above object is achieved by a method for determining a section-related running friction resistance of a belt conveyor system that is in operation, having the features according to claim 1. Further features and details of the invention result from the dependent claims, the description and the drawings.

The method according to the invention can be carried out in particular on a belt conveyor system which is used in particular for transporting bulk goods, has a conveyor belt and at least one drive for driving the conveyor belt and at least one carrier roller station comprising at least one carrier roller, advantageously three carrier rollers and a measuring system arranged at a measurement point. According to the invention, the measuring system has at least one speed sensor for determining the conveyor belt speed, a drive sensor for determining the drive power or the drive torque and a material flow sensor for determining the material mass flow. The belt conveyor system according to the invention is characterized in that it has at least one evaluation device for determining a section-related running friction resistance, in particular during operation of the belt conveyor system. The speed sensor, the drive sensor and the material flow sensor are connected to the evaluation device for data transmission. The evaluation device advantageously has an input unit for the manual input of data by an operator, for example. Data can be input via a keyboard, a touch panel, via voice input, and so on. It is also conceivable that the evaluation device has an output unit, such as a screen for the visual output of data, diagrams, etc. The evaluation device advantageously also has a memory unit, for example a memory unit designed as a ring memory, at least for the temporary storage of data, in particular constant and variable data and values and results, etc. The evaluation device also advantageously comprises a processing unit for determining at least the values of the section-related running friction resistance, in particular the section-related running friction resistance values. In order to receive data, values, etc. outside of the input unit, the evaluation device advantageously has a receiving and transmitting unit. Additional data can be transferred to the evaluation device via this receiving and transmitting unit, also wirelessly via Bluetooth, WLAN, etc. The receiving and transmitting unit advantageously also has interfaces for connecting data cables, such as AUX cables, HDMI cables, etc., so that other end devices or USB data sticks can also be connected to the evaluation device. It is also conceivable to send data, values, diagrams, etc., to other end devices (wired or wireless) via the receiving and transmitting unit of the evaluation device. The speed sensor, the drive sensor and the material flow sensor also send their determined data and values advantageously via a wireless connection to the evaluation device and in particular to the receiving and transmitting unit of the evaluation device. The transmitted data are then advantageously stored in the memory unit and transferred to the processing unit. It is also conceivable that the evaluation device has a comparison unit for comparing determined ACTUAL data/values with stored TARGET data/values.

Advantageously, in the belt conveyor system without additional sensors, in particular without force sensors in the conveyor belt, a section-related evaluation of the running roll resistance or the running friction resistance or general running resistance along the conveyor section can be carried out during normal operation of the belt conveyor system in order to ascertain local deviations in the running friction resistance from normal or permissible values. Within the context of the invention, without additional sensors means only the sensors that are fundamentally used in belt conveyor systems, such as the speed sensor for determining the conveyor belt speed or the motor speed, the drive sensor for determining the drive line or the drive torque and the material flow sensor for determining the material flow. The section-related running frictional resistance is determined purely by computer/mathematically using a linear system of equations, as explained in more detail below. The result of the section-related running friction resistance is then advantageously used, for example, by a service team of the belt conveyor system to prepare appropriate repair measures/maintenance measures in order to quickly and easily determine the faulty section portion that requires maintenance. It is also conceivable that the results of the determination of the section-related running friction resistance offer a relevant basis for the modification of the belt conveyor system, in particular with regard to increasing competitiveness.

According to the invention, the method for determining a section-related running friction resistance of a belt conveyor system in operation, as described above, has at least the following steps:

A) dividing the conveyor section of the belt conveyor system into "m" system-specific sections, in particular with different or also the same segment lengths, B) input of constant data at least with regard to the transport length of the belt conveyor system, the length of the segments, in particular the number of segments, and the incline or decline per segment into the evaluation device, C) continuous recording of varying data at least with regard to the current conveyor belt speed, the material mass flow and the drive power or the drive torque, D) specification of determination data comprising a current material section mass and a segment-specific belt loading of the entire belt conveyor system based on the measured material mass flow at the measurement point, E) storage of the completely recorded varying data and the determination data in the evaluation device after each passage through a defined conveyor belt portion of the conveyor belt, wherein each passage is advantageously numbered with a consecutive index "j", and F) calculation of the load-dependent running friction resistance for each segment and the idling power of the belt conveyor system by the evaluation device by means of a system of equations using the constant data, the varying data and the determination data.

According to step A), the conveyor section is divided at least into m>=2 segments. The conveyor section is understood to mean that portion of the belt conveyor system which is used to transport the goods, in particular bulk goods, and runs from a receiving region for receiving the bulk goods to a discharge region for dropping off the bulk goods (e.g. onto another belt conveyor system). The segments are determined depending on the belt conveyor system. More precisely, depending on the structure and course of the belt conveyor system, taking into account the straight sections, curved sections, etc., at least the number of segments is defined. Advantageously, the section length/segment length is also specified for each defined segment. Accordingly, it is conceivable that the segments can each have a different length from one another. It is also possible for segments to have the same segment lengths as one another, in particular if the segments are substantially the same, such as straight sections, etc.

According to step B), constant and known data are entered into the evaluation unit, in particular manually. Constant data is understood to mean data that does not change in the course of operating the belt conveyor system or that has unchanged/unchangeable values over a defined period/period of time and that can be assigned specifically to the belt conveyor system in question. This is, for example, data regarding the length of the conveyor belt or the transport length of the belt conveyor system, the number of segments, as divided up in step A), and/or the length of the individual segments, as well as the indication of inclines and/or declines per segment.

According to step C), during the operation of the belt conveyor system, data, in particular varying data, is continuously determined or recorded via the existing sensors, such as the speed sensor for determining the conveyor belt speed, the drive sensor for determining the drive power or the drive torque and the material flow sensor for determining the material mass flow, and advantageously transmitted to the evaluation device. These varying data primarily affect the entire belt conveyor system. In order to determine or specify, in particular to calculate, in particular a segment-specific belt loading q m or a segment-specific mass flow, in step D) so-called determination data are calculated. This is data generated from calculations between constant data and varying data. These determination data are, for example, a current material section mass ($M_1, \ldots, M_m$) and a segment-specific belt loading, which is advantageously determined using a belt loading matrix q. The determination data primarily relate to the entire belt conveyor system and are therefore based at least on the material mass flow measured at the measurement point, the conveyor belt speed and the section layout. The belt loading matrix q is advantageously stored as a calculation model in the evaluation device. This belt loading matrix is explained in more detail below. The determined or calculated values with regard to the segment-specific belt loading q m are now also stored as varying values/data, in particular as determination data, as well as all other varying data, in the evaluation device, in particular in its memory unit, according to step E). The values of the material gravity distribution ($q_1, q_2, \ldots, q_m$)

per conveyor section can be determined as the product of the material section masses ($M_1, \ldots, M_m$) and gravitational acceleration g.

According to step F), the load-dependent running friction resistances $f_i$ for each defined segment i=1, . . . , m as well as the idling power of the entire belt conveyor system $P_0$ are then finally calculated using an equation system, in particular a linear equation system, stored in the evaluation device, in particular in the memory unit. The processing power for this is advantageously taken over by the processing unit of the evaluation device.

Consequently, with the described method according to the invention, a complete course of the conveyor belt loading along the conveyor section of the belt conveyor band is determined for a current or later point in time with a previously defined division of the conveyor section into segments based on the mass flow and conveyor belt speed and recorded as a data set together with the time-associated drive line or drive torque or driving force. By collecting at least m+1 data sets with conveyor belt loads that differ from one another and then resolving the recorded data using the linear system of equations, both the local section-specific running friction resistance $f_i$ related to the transport mass and a load-independent idling power $P_0$ of the belt conveyor system can be determined. The friction losses in the overall drive of the belt conveyor system are also advantageously taken into account. It should also be noted that when using the linear system of equations, a linear dependency of the running frictional resistance on the transport mass or the mass flow is assumed.

It is advantageously conceivable that the system of equations for determining the load-dependent running friction resistance vector f is generated for each complete rotation of the belt, wherein the system of equations includes the corresponding data in terms of a belt loading matrix qq and a total movement resistance force vector ΔR as follows:

$$q \times f = \Delta R$$

A multiple over-determination of the linear system of equations, in particular with an even distribution of the determined data sets over at least one complete loop rotation of the entire conveyor belt of the belt conveyor system, results in a significant increase in the determination/calculation accuracy is achieved both for the section-related running friction resistances "$f_i$" and for the load-independent idling power "$P_0$".

According to a further embodiment, an instantaneous lifting power "$P_{H,j}$" of the total transported material flow mass of the belt conveyor system is determined as the sum of the instantaneous lifting powers ($P_{H,i,j}$) of all segments (i=1, . . . , m) and stored in the evaluation device as the varying data "j" for each data set. If, when determining the drive power, the conveyor belt loading-specific lifting power of the material mass currently being conveyed is subtracted, or if the local gradient of the conveyor section is subtracted after determining the section-specific transport mass-related running resistance, in particular taken into account, the result is the running friction resistance "adjusted" from the lifting work. These "adjusted" running friction resistances serve as an indication of the functional condition of the carrier rollers in the respective section region with a comparable carrier roller support (carrier roller distances and diameters, curves) and a comparable belt tension.

Within the scope of the invention, "$P_{H,i,j}$" is advantageously used to indicate the lifting power of the conveyed goods on segment no. "i" at time "$t_i$". Furthermore, within the scope of the invention, "$t_j$" indicates the point in time when the conveyor belt passes through a new conveyor belt portion ΔL with the consecutive number "j". In particular, within the scope of the invention, "ΔL" indicates the conveyor belt portion length when the conveyor belt runs through, in order to generate a new recording of the measurement data for the system of equations.

It is also possible that the segment-specific belt and carrier roller gravity ($q_{0,j}$) per segment length ($L_1, \ldots L_m$) are entered into the evaluation device (20) as constant data, in particular as constantly acceptable data, in particular entered manually by an operator. However, it is also conceivable that constant data is recorded on an external storage medium, such as a data stick for each belt conveyor system, and this external storage medium is then connected to the evaluation unit (LAN or WLAN), so that this data is then automatically or semi-automatically (plug and play) transferred or copied to the evaluation unit.

According to a further embodiment, the belt loading matrix q is determined as the respective section-specific gravity distribution of the material mass flow $q_{i,j}$, in particular the belt loading, for each segment i=1, . . . , m and for each measurement j=1, . . . , nk, and as the quotient of drive efficiency η and the conveyor belt speed $V_{B,j}$, as follows:

$$q = \begin{vmatrix} q_{1,1} & q_{2,1} & q_{3,1} & & q_{m,1} & \eta/V_{B,1} \\ q_{1,2} & q_{2,2} & q_{3,2} & \cdots & q_{m,2} & \eta/V_{B,2} \\ q_{1,3} & q_{2,3} & q_{3,3} & & q_{m,3} & \eta/V_{B,3} \\ \ldots & \ldots & \ldots & \ldots & \ldots & \ldots \\ q_{1,nK} & q_{2,nK} & q_{3,nK} & \cdots & q_{m,nK} & \eta/V_{B,nK} \end{vmatrix}$$

The sequential number of the segments is denoted by "i=1, . . . , m". The sum of the segments "i" results in the conveying section of the belt conveyor system. Furthermore, within the scope of the invention, the gravitational force of the material mass flow for the section "i" in the data set "j" is identified as "$q_{i,j}$".

It is conceivable that the respective gravity of the material mass flow $q_{i,j}$ results as a product of the respective section-specific mass ($M_{1,j}, M_{2,j}, \ldots, M_{m,j}$) of conveyed material (material mass) and the gravitational acceleration g per measurement j=1, 2, . . . , nk during the last "n" full revolutions of the conveyor belt.

Within the scope of the invention, "n" is advantageously used to indicate the number of the last complete belt revolutions that are to be used to evaluate the section-related running resistances in the system of equations.

According to a further embodiment, the total motion resistance force vector ΔR is determined as the quotient of the difference between the instantaneous drive power $P_j$—multiplied by the drive efficiency η—and the instantaneous lifting power $P_{H,j}$, and the conveyor belt speed $V_{B,j}$, as follows:

$$\Delta R = \begin{vmatrix} (P_1\eta - P_{H,1})/V_{B,1} \\ (P_2\eta - P_{H,2})/V_{B,2} \\ \vdots \\ (P_{nK}\eta - P_{H,nK})/V_{B,nK} \end{vmatrix}$$

Furthermore, the section-related running friction resistance vector f to be determined consists of load-independent factors $f_1, \ldots, f_m$ for each segment $L_1, \ldots, L_m$ and the average idling power $P_0$ of the entire belt conveyor system, especially within the last n full conveyor belt revolutions:

$$f = \begin{bmatrix} f_1 \\ f_2 \\ \dots \\ f_m \\ P_0 \end{bmatrix}$$

For the specific acquisition of the varying data, in particular measurement data such as the mass flow, the conveyor belt speed and/or the drive power or the drive torque, a time correction of the signals and a correct derivation of the conveyor belt loading along the conveyor section based on this is required. This detection, correction and derivation are advantageously possible thanks to the evaluation device, in particular the receiving and transmitting unit, the processing unit and/or the comparison unit of the evaluation device. By means of the evaluation device, a chronological sequence of the data sets is advantageously completed and a length-specific distribution of the total load on the conveyor section is determined. In order to record the plurality of data sets and to determine the section-related (section-specific, transport mass-related) running friction resistances, the complete data sets are advantageously temporarily stored in the evaluation device, in particular the evaluation device's memory unit. This memory unit is advantageously designed as a ring memory. With this ring memory, the oldest data set is continuously overwritten with the most recent (newest) data set. As a result, the ring memory is always only filled with the current information (data/data sets) about at least one last complete rotation of the conveyor belt (loop). The section-related running friction resistances $f_i$, and the load-independent idling power $P_0$ are determined by regularly querying the memory unit, in particular the ring memory, with subsequent formation of the belt loading matrix q and the resolution of the linear system of equations. This determined or calculated data is then stored in turn—advantageously together with the associated operating parameters of the belt conveyor system—in the evaluation device, in particular in the memory unit of the evaluation device or also in a separate long-term memory unit of the evaluation device. This data can then be displayed in tabular or graphical form via the output unit of the evaluation device, as required.

It is conceivable that with regard to an optimized evaluation of the current condition of the rollers, all recorded and/or determined data (constant data and/or varying data) can be limited according to date, throughput, conveyor belt speed and temperature ranges and can be displayed overlaid with a regression curve.

According to a further embodiment, the number of complete data sets "k" for the solution of the linear system of equations has at least twice the value of "m" and is consequently stored in the evaluation device according to an integer number n of the complete rotation of the conveyor belt, in particular of the complete revolution of the conveyor belt.

It is therefore advantageously conceivable that the number of data sets of varying data stored in the evaluation device corresponds to at least twice the number of segments of the conveyor section for each conveyor belt rotation to be stored, wherein the oldest data set of varying data stored in the evaluation device is continuously overwritten by the most recent data set of varying data. This multiple evaluation by solving a multiply overdetermined linear equation system, based on the measurements over the last complete rotation of the conveyor belt of the belt conveyor system (loop), evenly distributed over time, leads to an advantageous increase in the determination accuracy of the section-related running friction resistances. The last measurements are advantageously superimposed in such a way that outliers, such as local increases in the running friction resistances due to damage to the carrier rollers, can be reliably identified.

This means that for doubling or multiplying the number of equations in the system of equations in comparison to the number of unknown data present in the system of equations, the currently determined varying data per complete conveyor belt rotation are superimposed with the varying data of one or more previous complete conveyor belt rotations.

It should also be noted that $\Delta L$ is the length of the conveyor belt per measurement. $\Delta L$ advantageously has a plurality of segments $L_1, \dots L_m$ and can also be referred to as a conveyor belt measurement section. In the context of the invention, a plurality is to be understood as meaning at least one segment, advantageously two or more segments. $L_B$ indicates the total length of the conveyor belt. "k" indicates an integer number of conveyor belt measurement sections per complete conveyor belt length $L_B$ or a number of data sets generated for a complete conveyor belt revolution or a complete conveyor belt rotation.

$$L_B = k * \Delta L$$

More precisely, each measurement advantageously takes place per conveyor belt measurement section, wherein the conveyor belt has a number "k" of conveyor belt measurement sections.

It is conceivable that the determination of section-related running friction resistance values based on variable data is carried out at least until each of the defined sections during the last complete conveyor belt rotation, in particular during the last complete conveyor belt revolution, is allocated a minimum change in the material mass flow (load change) from a mean value calculated for this segment, in particular in the range of more than 5% of the nominal load. This means that as a relevant prerequisite for a correct solution of the linear system of equations a minimal change in the conveyor belt loading of the material mass flow $\Delta q_{i,min}$ in each segment "i" (corresponds to the column number in the belt loading matrix q) between the different data sets "j" (corresponds to the columns in the belt loading matrix q) is required. If the material mass flow does not change for one or more segments "i", for example due to having no load, full loading or an unfavorable segment loading, the measurement or data acquisition is extended or postponed so that each segment "i" experiences a minimal load change ($\Delta q_i = q_{i,max} - q_{i,min}$) of, for example, 5% of the nominal load.

Advantageously, within the scope of the invention, the consecutive number of the data set recording, which takes place after a new conveyor belt section has been passed through, is identified with "j". Furthermore, within the scope of the invention, "$q_{i,max}$" is the maximum and "$q_{i,min}$" is the minimum gravity of the material mass flow occupancy for the section "i" in the belt loading matrix "q".

According to a further embodiment, the transported mass quantities of a defined number of adjacent segments are added together and the measured values with regard to the current drive power $P_j$ and the current conveyor belt speed $V_B$, are averaged in order to create a reduced system of equations. When adding the transported material mass to the defined number of segments, it is conceivable to add at least two segments that are adjacent to one another, in particular to add the segments in pairs, for example $L_1+L_2$, . . . , $L_{m-1}+L_m$.

All the advantages that have already been described for the belt conveyor system according to the first aspect of the invention result from the method described.

According to a further alternative method, it is possible to change the conveyor belt speed of the belt conveyor system at least temporarily with a defined periodicity in a sinusoidal or zigzag manner or in the form of a ramp. The resulting changes in the conveyor belt occupancy (material mass flow) result in increased determination accuracy for determining the section-related running friction resistances with the desired number and distribution of segments.

It is understood that the features mentioned above and those still to be explained below can be used not only in the combination specified in each case, but also in other combinations or on their own, without departing from the scope of the present invention.

Figure 2:
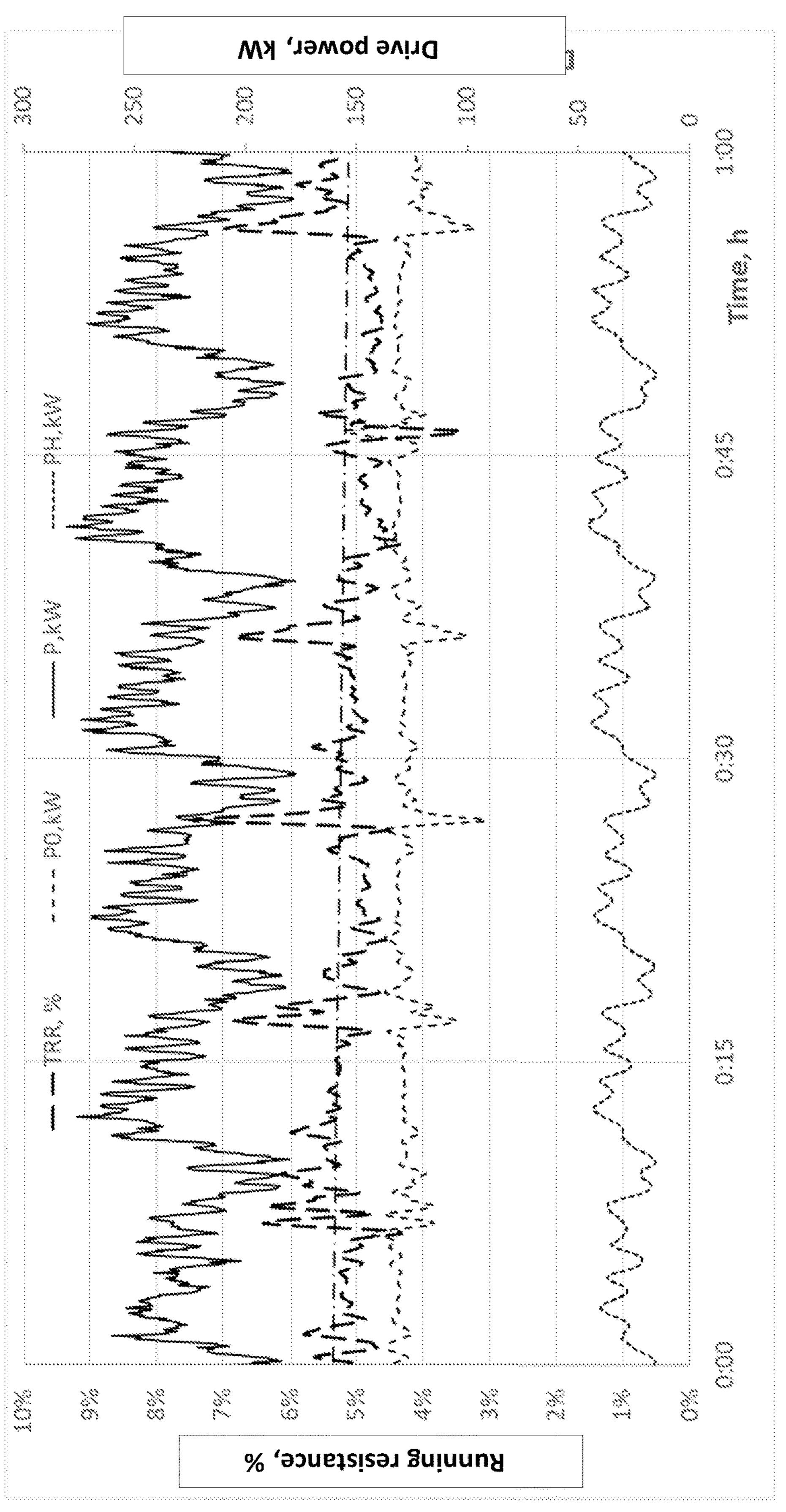
Figure 3:
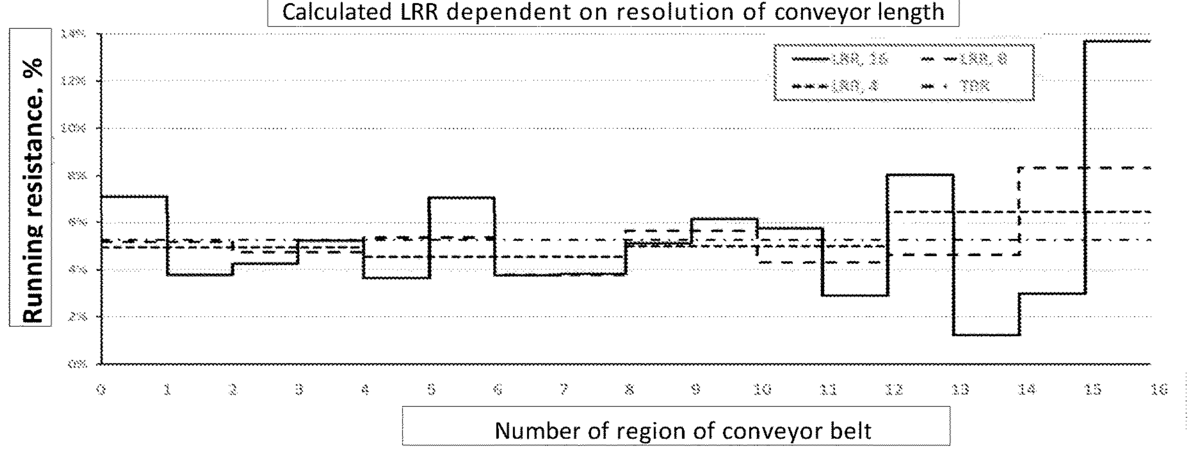

Graphic representations of the method according to the invention of a belt conveyor system according to the invention that is in operation are explained in more detail below with reference to drawings. They each offer a schematic representation:

FIG. 1 shows an embodiment of a division of a conveyor section of a belt conveyor system according to the invention, FIG. 2 shows an embodiment of a graphical representation of recorded variable data, and FIG. 3 shows an embodiment of a graphical representation of ascertained/calculated data per segment.

Elements with the same function and mode of operation are each provided with the same reference numerals in FIGS. 1 to 3.

FIG. 1 shows an embodiment of a belt conveyor system 1 according to the invention having a conveyor belt 10, at least one drive 11 for driving the conveyor belt 10 and at least one carrier roller station 12, advantageously two or more carrier roller stations 12, each comprising at least one carrier roller 13 and a measuring system S arranged at a measurement point 3. The measuring system S advantageously comprises a speed sensor, not shown here, for is determining the conveyor belt speed, a drive sensor, not shown here, for determining the drive power or the drive torque, and a material flow sensor, not shown here, for determining the material mass flow. Furthermore, the belt conveyor system 1 has at least one evaluation device 20 for determining a section-related running friction resistance, wherein the speed sensor, the drive sensor and the material flow sensor are connected to the evaluation device for data transmission (shown with a dashed line). The embodiment of the belt conveyor system 1 according to the invention shown in FIG. 1 also shows an exemplary division of a conveyor section 2 of the embodiment of the belt conveyor system 1 according to the invention. The conveyor section 2 is divided into m=18 segments $L_1$-$L_{18}$ (L1, L2, . . . , $L_1$, . . . , Lm). $Q_E$ shows the current (present) conveyed quantity of bulk material at the input point 4, i.e. the quantity of bulk material that is currently being introduced/applied to the belt conveyor system 1. $Q_A$ shows the current (present) conveyed quantity of bulk material at the discharge transfer point 5, i.e. the quantity of bulk material which is currently being released from the belt conveyor system to, for example, another belt conveyor system not shown here. The sensors S, in particular the speed sensor for determining the conveyor belt speed $V_B$, the drive sensor for determining the drive power P or the drive torque or the drive speed n A and the material flow sensor for determining the material mass flow $Q_S$ are arranged at measurement point 3. The measurement point 3 is formed at a defined distance $X_S$ to the input point 4. The determined material mass flow $Q_S$ is converted into a material mass flow occupancy $q_x$ or into the material section masses $M_i$ (material mass per segment— $M_1$, $M_2$, . . . , $M_i$ . . . , $M_m$) taking into account the conveyor belt speed $V_B$ and the distance $x_S$ According to FIG. 1, "x" is the longitudinal coordinate along the belt conveyor system 1 starting from the input point 4 and "$x_S$" is the distance of the mass flow sensor along the belt conveyor system 1. As a basis for the formation of the linear system of equations, the entire conveyor section 2 is divided up into clearly defined segments $L_1$-$L_m$ with known section lengths, inclines, declines, curves and carrying roller assemblies. The material mass flow occupancies $M_1$-$M_m$ corresponding to the measurement time and the corresponding conveyor belt speed $V_B$ are then recorded or determined for these specified segments $L_1$-$L_m$. For at least "m+1" complete data sets, the measurement data (varying data on material mass flow occupancy $q_x$ along the entire conveyor section 2, drive power P and conveyor belt speed $V_B$) are recorded and a belt loading matrix q of the linear system of equations is formed. The running friction resistance coefficients of the individual segments ($f_1$, $f_2$, . . . fi, . . . , $f_m$) are calculated together with the load-independent idling power $P_0$ from at least "m+1" linear equations with different loads $M_1$, $M_2$, . . . , Mi . . . , Mm of the corresponding segments L1-Lm. The exemplary division of the conveyor section into m=18 segments $L_1$-$L_{18}$ shows, for example, in segment $L_{12}$ a significantly higher value in segment L12 than in the vicinity of this section $L_{12}$, as can be seen from the bar chart. A bar chart can, for example, be an embodiment of a graphical representation of is the calculated/determined results with regard to the section-related running friction resistances. However, other representations, as shown in particular in FIGS. 2 and 3, are also conceivable. This deviation shown can be understood by the service team of the belt conveyor system 1 as an indication that an inspection of the carrier rollers is particularly necessary in this region of segment L122.

FIG. 2 shows the measured drive power P (in kW) of the entire belt conveyor system in relation to the determined total running friction resistance TRR (in %) over time (in h) by means of a line diagram. The relative total (overall) running friction resistance TRR of the entire belt conveyor system, determined as the ratio of the increase in running resistance force to the gravity of the mass of material currently being transported, is shown with a dotted line. The idling power of the belt conveyor system is shown as a dashed line with $P_0$. The lifting power of the entire belt conveyor system is shown with a long dashed line with $P_H$. All capacities determined are plotted over time t. The capacities were determined within one hour (60 minutes) and recurring swings associated with cyclical load changes with a period of approx. 12 minutes were shown. The belt revolution time is 7 minutes. Thanks to the evaluation of the data over a full revolution of the conveyor belt, no conveyor-belt-related periodicity can be identified in the recording or in the determination data. The idling power and total running frictional resistance remain substantially stable over the entire acquisition time and can be used for further section-specific resolution.

FIG. 3 shows a visualization of determined section-related running friction resistance values $f_i$ over a conveyor section 2 of a belt conveyor system 1 divided into m=16 segments $L_1$ -$L_{16}$ (as shown in FIG. 1). The solid line graphically depicts a total of 16 results of the section-related running friction resistance values $f_i$ determined, in particular one result per segment $L_1$-$L_{16}$ (LRR, 16). If a complete resolution of the linear system of equations becomes impossible, the number of or the division of segments $L_1$-$L_m$ is reduced in such a way that an occupancy of two, three, four or more adjacent segments $L_1$-$L_m$ is added to one another or divided. The averaged values/data regarding the conveyor belt speed $V_B$ and the drive power P are then used for these portions. This is reflected in the dashed lines LRR,8 and LRR,4. Here the original 16 segments $L_1$-$L_{16}$ were either reduced to a total of eight segments ($L_1$-$L_8$, LRR,8) in such a way that two adjacent segments were combined. Or the original 16 segments $L_1$-$L_{16}$ were reduced to a total of four segments (LRR, 4) in such a way that four segments that were adjacent to one another were now combined into just four segments $L_1$-$L_4$. In this way, a coarser resolution of the course of the running frictional resistance is obtained, which can subsequently be made more precise by superimposing further (new) data from subsequent or previous measurements. The value averaged over all segments $L_1$-$L_{16}$ is specified with TRR (dash-dot line).

In order to enable a simplified conversion of the initial system of linear equations with "m" segments (in FIG. 3 with 16 segments) into a two-, three-, four- or six-fold reduced linear system of equations, the number "m" of the segments is defined as a minimum or multiple number for the desired reduced number, such as m=12, 24, 36, 48, 60, etc. It should be noted that the length per segment when using a maximum resolution of "m" segments is not significantly less than the distance between the carrier rollers in the belt conveyor system. This means that a method for determining section-related running friction resistances, in particular key indicators of section-related running friction resistances, begins with a determination of the conveyor belt occupancy with the highest resolution on "m" segments and after each passage of the conveyor belt a new data set with a current occupancy on "m" segments, the current drive power P and the conveyor belt speed VB is temporarily stored. The last "k" data sets of the last complete conveyor belt rotation (loop) of the belt conveyor system are first used to form the linear system of equations with "m+1" unknowns. Since there are k>m+1, i.e. more data sets than unknowns in the system of equations, the overdetermined system of equations is solved with an approximation, so that all "m" unknown section-related running friction resistance key indicators ($f_1, f_2, \ldots, f_i, \ldots, f_m$) as well as the unknown load-independent non-load power of the entire conveyor belt system $P_0$ can be determined. In order to increase the meaningfulness of the running friction resistance key indicators ($f_1, f_2, \ldots, f_i, \ldots, f_m$), it is conceivable to redetermine the respective section-related running friction resistances after receiving a new data set and to form an average value for each section-related running friction resistance using the last saved "nk" data sets. In particular, "m" indicates the total integer number of segments on the conveyor section of the belt conveyor system.

Even if the accuracy determined for determining the section-related running friction resistances is not sufficient, for example because the scatter of the determined values/data over several conveyor belt rotations is too high, it is advantageous to carry out the reduced resolution of the segments already described above. As previously mentioned, two or more adjacent segments are combined, which advantageously reduces the number of unknown variables to m/2+1, m/3+1, etc., as well as the corresponding number of data sets to k/2, k/3, etc. Advantageously, solving a correspondingly reduced system of linear equations leads to a more precise determination of the key indicators of the section-related running friction resistances of the "enlarged" (summarized) segments described. This can also be used to advantage for the precise evaluation of the changes in the section-related running friction resistances over time, the temperature and/or the conveyor belt loading (material mass flow) or also for evaluating the condition of the carrier rollers.

LIST OF REFERENCE NUMERALS

1 belt conveyor system
2 conveyor section
3 measurement point
4 input point
5 discharge transfer point
10 conveyor belt
11 drive
12 carrier roller station
13 carrier roller
14 measurement point
20 evaluation device
$f_i$ section-specific running friction resistance/section-related running friction resistance key indicator
$L_1, \ldots, L_m$ length of the individual segments along the belt conveyor system
LRR section-related running friction resistance
LRR,4 section-related running friction resistance for four segments
LRR,8 section-related running friction resistance for eight segments
LRR,16 section-related running friction resistance for sixteen segments
M number of segments in the belt conveyor system
$M_i$, $M_1$-$M_m$ material masses per segment
$n_A$ drive speed
P drive power
$P_H$ lifting power
$P_0$ idling power of the entire belt conveyor system, which includes all drive power losses and the product of all load-independent running resistances with the conveyor belt speed
$Q_S$ material mass flow on the conveyor belt in the measuring range of the mass flow sensor
$q_x$ material mass flow occupancy at the longitudinal coordinate x
S sensors/measuring system
TRR relative total running friction resistance TRR of the entire belt conveyor system, determined as the ratio of the increase in running resistance force to the gravity of the material mass currently being transported
$V_B$ conveyor belt speed
x length coordinate along the belt conveyor system from the input point
$x_S$ distance of the mass flow sensor along the belt conveyor system
ΔR total movement resistance force vector

The invention claimed is:

1. A method for determining a section-related running friction resistance ($f_i$) of a belt conveyor system that is in operation, the method including:

dividing a conveyor section of the belt conveyor system into "m" system-specific segments ($L_1, \ldots, L_m$);

inputting of constant data at least with regard to a transport length of the belt conveyor system, a segment length of the system-specific segments ($L_1, \ldots, L_m$) and an incline or a decline per system-specific segment ($L_1, \ldots, L_m$) into an evaluation device;

continuous recording of varying data at least with regard to a current conveyor belt speed ($V_B$), a material mass flow ($Q_S$) and a drive power (P) or a drive torque;

specifying of determination data comprising at least a current material section mass ($M_1, \ldots, M_m$) and a segment-specific belt loading ($q_1, \ldots, q_m$) of the belt conveyor system based on the material mass flow ($Q_S$) at a measurement point;

storing of the varying data and the determination data in the evaluation device after each passage through a defined conveyor belt portion ($\Delta L$) of a conveyor belt in the conveyor belt system, wherein each passage is numbered with a consecutive index "j"; and calculating of a load-dependent running friction resistance ($f_{i,j}, \ldots, f_{m,j}$) for each of the system-specific segments ($L_1, \ldots, L_m$) and an idling power ($P_o$) of the belt conveyor system by the evaluation device by means of a system of equations using the constant data, the varying data and the determination data.

2. The method according to claim 1,
characterized in that
the system of equations for determining the load-dependent running friction resistance (f) for last "n" complete belt revolutions is generated, wherein the system of equations comprises corresponding data with regard to a belt loading matrix (q) and a total movement resistance force vector ($\Delta R$), as follows:

$$q \times f = \Delta R.$$

3. The method according to claim 1,
characterized in that
a current lifting power ($P_{H,j}$) of a total transported material flow mass of the belt conveyor system is additionally determined as the varying data as a sum of current lifting powers ($P_{H,i,j}$) of all the system-specific segments and is stored in the evaluation device.

4. The method according to claim 1,
characterized in that
the segment-specific belt loading and a carrier roller gravity ($q_{0,i}$) per segment length ($L_1, \ldots, L_m$) are also entered into the evaluation device as the constant data.

5. The method according to claim 2,
characterized in that
the belt loading matrix (q) is determined as a respective section-specific gravity distribution of the material mass flow $q_{i,j}$ in particular the segment-specific belt loading ($q_1, \ldots, q_m$), for each system-specific segment ($i=1, \ldots, m$) and for each measurement ($j=1, \ldots, nk$) and as a quotient of a drive efficiency $\eta$ and the current conveyor belt speed $V_{B,j}$, as follows:

$$q = \begin{vmatrix} q_{1,1} & q_{2,1} & q_{3,1} & & q_{m,1} & \eta/V_{B,1} \\ q_{1,2} & q_{2,2} & q_{3,2} & \cdots & q_{m,2} & \eta/V_{B,2} \\ q_{1,3} & q_{2,3} & q_{3,3} & & q_{m,3} & \eta/V_{B,3} \\ \cdots & \cdots & \cdots & \cdots & \cdots & \cdots \\ q_{1,nK} & q_{2,nK} & q_{3,nK} & \cdots & q_{m,nK} & \eta/V_{B,nK} \end{vmatrix}.$$

6. The method according to claim 2,
characterized in that
the total movement resistance force vector ($\Delta R$) is determined as a quotient of a difference between a current drive power ($P_j$) multiplied by a drive efficiency ($\eta$)), and a current lifting power ($P_{H,j}$), and the current conveyor belt speed (Vb,j),$_{B,j}$), as follows:

$$\Delta R = \begin{vmatrix} (P_1\eta - P_{H,1})/V_{B,1} \\ (P_2\eta - P_{H,2})/V_{B,2} \\ \cdots \\ \cdots \\ (P_{nK}\eta - P_{H,nK})/V_{B,nK} \end{vmatrix}.$$

7. The method according to claim 1,
characterized in that
the section-related running friction resistance (f) to be determined consists of load-independent factors ($f_1, \ldots, f_m$) for each segment ($L_1, \ldots, L_m$) and an average idling power ($P_0$) of the belt conveyor system:

$$f = \begin{bmatrix} f_1 \\ f_2 \\ \cdots \\ f_m \\ P_0 \end{bmatrix}.$$

8. The method according to claim 2,
characterized in that
a number of complete data sets "k" for a solution of the system of equations has at least twice a value of "m" and consequently an integer number "n" of complete conveyor belt rotations are stored in the evaluation device accordingly.

9. The method according to claim 1,
characterized in that
a number of data sets of the varying data stored in the evaluation device corresponds to at least twice a number (>2 m) of the system-specific segments ($L_1, \ldots, L_m$) of the conveyor section for each conveyor belt rotation to be stored, wherein an oldest data set of varying data stored in the evaluation device is continuously overwritten by a most recent data set of varying data.

10. The method according to claim 1,
characterized in that
for doubling or multiplying a number of equations in the system of equations in comparison to a number of unknown data present in the system of equations, a currently determined varying data per complete conveyor belt revolution are superimposed with the varying data of one or more previous complete conveyor belt rotations.

11. The method according to claim 1,
characterized in that
the determination of section-related running friction resistance ($f_i$) based on variable data is carried out at least until each of the system-specific segments ($L_1, \ldots, L_m$) during a last complete rotation of the conveyor belt shows a minimal change in the material mass flow ($Q_s$) from a mean value calculated for this segment ($L_1, \ldots, L_m$), in particular in a range above 5% of a nominal load.

12. The method according to claim 1,
characterized in that
transported mass quantities of a defined number of adjacent segments are added together and measured values with regard to a current drive power ($P_j$) and the current conveyor belt speed ($V_j$) are averaged in order to create a reduced system of equations.

* * * * *